July 25, 1944.   J. C. WHITESELL, JR   2,354,628
INSPECTION APPARATUS
Filed Feb. 6, 1942   3 Sheets-Sheet 1
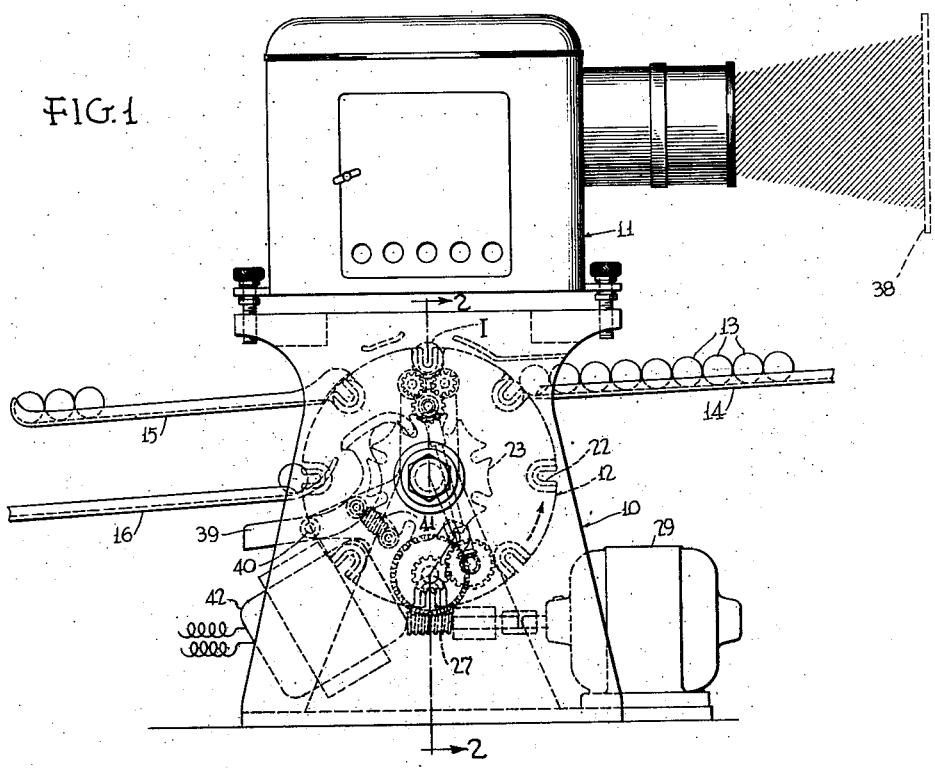
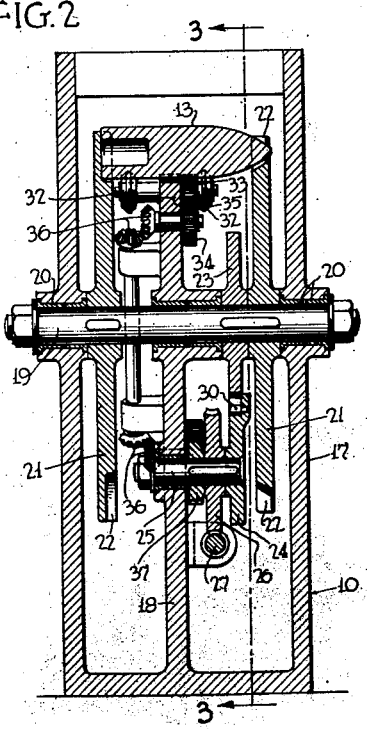
INVENTOR
John C. Whitesell, Jr.
BY John P. Tartox
ATTORNEY July 25, 1944.  J. C. WHITESELL, JR  2,354,628
INSPECTION APPARATUS
Filed Feb. 6, 1942  3 Sheets-Sheet 2
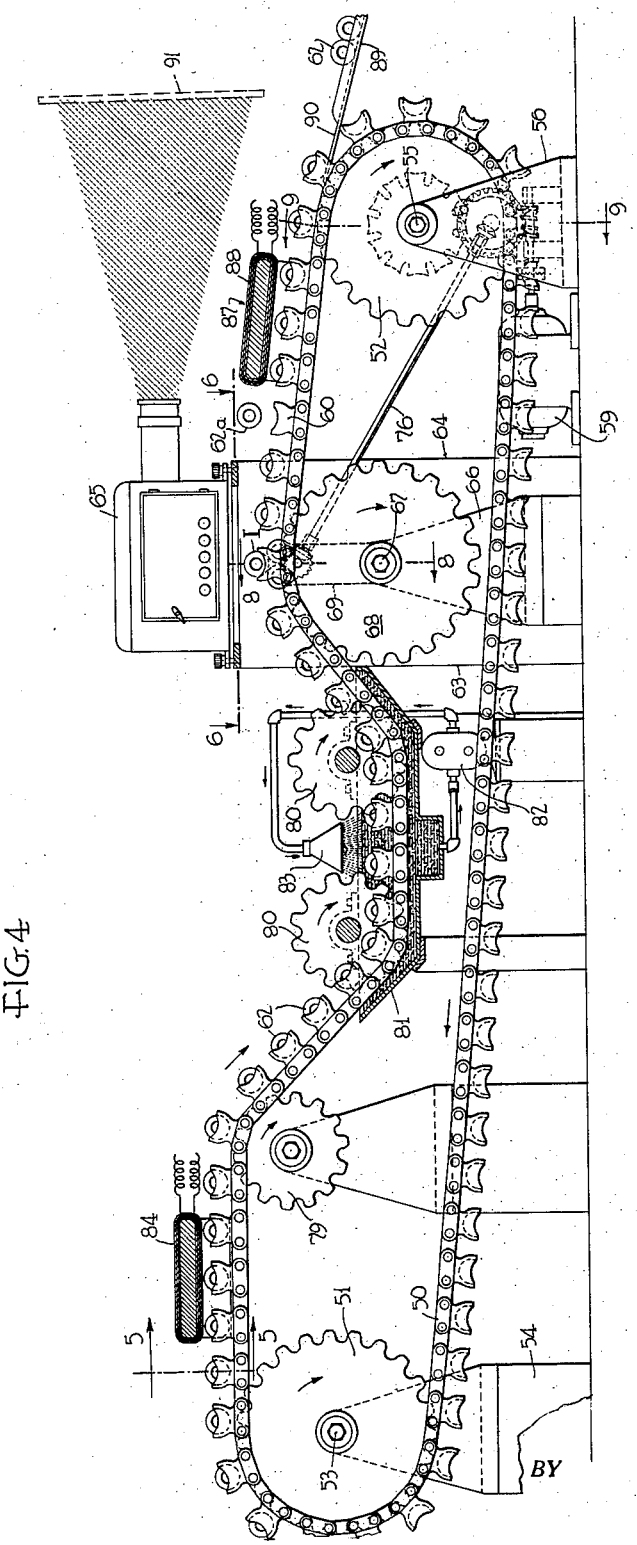
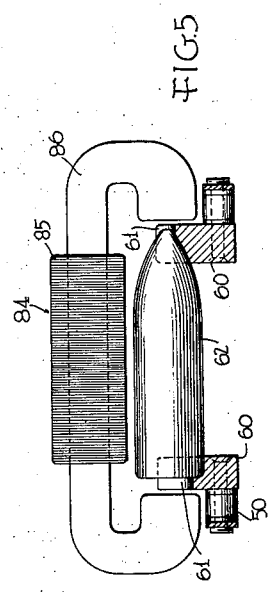
INVENTOR
John C. Whitesell, Jr.
BY
John P. Tarbor
ATTORNEY July 25, 1944.  J. C. WHITESELL, JR  2,354,628
INSPECTION APPARATUS
Filed Feb. 6, 1942  3 Sheets-Sheet 3
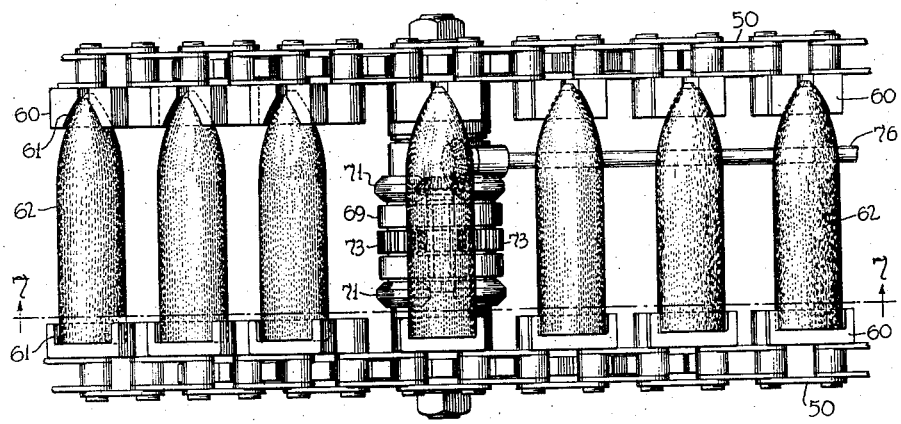
FIG.6
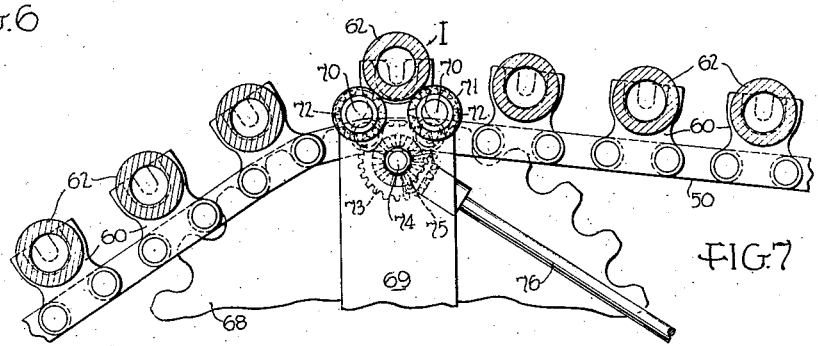
FIG.7
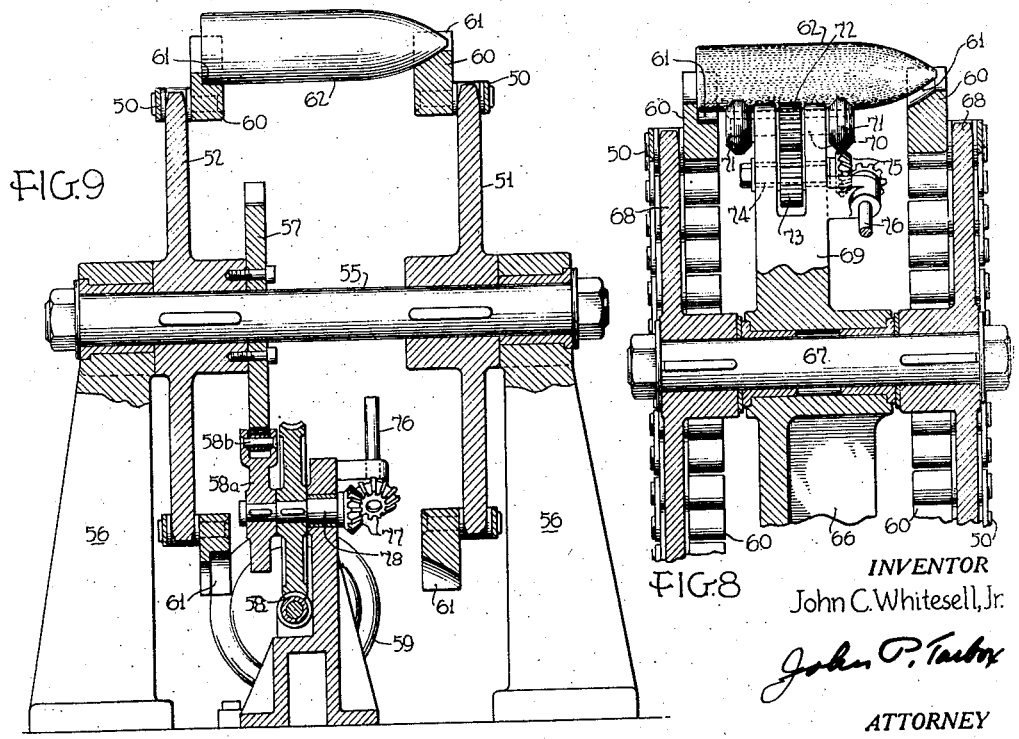
FIG.9
FIG.8
INVENTOR
John C. Whitesell, Jr.
ATTORNEY Patented July 25, 1944

2,354,628

UNITED STATES PATENT OFFICE 2,354,628

INSPECTION APPARATUS

John C. Whitesell, Jr., Merion, Pa., assignor to Edward G. Budd Manufacturing Co., Philadelphia, Pa., a corporation of Pennsylvania Application February 6, 1942, Serial No. 429,755

13 Claims. (Cl. 88—24)

This invention relates to inspection apparatus, more particularly to apparatus for inspecting metallic articles for surface cracks and flaws.

The inspection of metallic articles, such as for example, projectiles and the like, is usually performed by a workman who is required to handle each article in such manner that he can scan the entire surface of the article with the naked eye to detect surface cracks and flaws. It is obvious that with cylindrical objects, such as projectiles and the like, it is necessary for the inspector to manually rotate the article in order to view the entire peripheral surface thereof. Such articles frequently are of considerable weight and as a result this method is slow and cumbersome, particularly in the case of large projectiles and the like and necessitates a large corps of inspectors in order to maintain large quantity production.

The present invention contemplates an apparatus of such construction that metallic articles produced in large quantities not only can be rapidly and economically inspected for surface cracks and flaws, but also can be accurately inspected with a minimum of man power and time which is at a premium in times of war.

Another object is to provide an inspection apparatus of such character that the individual articles to be inspected are automatically conveyed to a predetermined inspection point and in which it is not necessary for the workman performing the particular inspection operation to individually handle or even touch the articles to be inspected.

These objects are attained according to the present invention through the provision of an apparatus of such construction that the articles to be inspected are successively conveyed to a predetermined station where a greatly enlarged image of the surface of the article is projected upon a screen for observation by the inspector or operator of the apparatus. In carrying out this operation an endless conveyor is employed for automatically moving the articles to the predetermined inspecting or projecting station in association with a suitable reflection projection device, such as for example, a "Balopticon," provision being made for rotating each article at the inspection station so that the image of its entire peripheral surface can be projected upon the screen. Provision is also made so that the inspector can automatically eject an article from the apparatus in event he should detect a surface crack in the same.

In a modification of the apparatus just described, the present invention further contemplates the use, where the articles to be inspected are of a material capable of being magnetized, of means for magnetizing the articles so that they can attract and become coated with finely divided particles of magnetic material prior to reaching the inspection station. Such iron particles tend to lie flat on the surface of the article except where there is a surface crack. The finely divided particles extend normal to the surface of the article at such cracks due to the change in direction of the magnetic flux path with the result that the change in surface pattern or appearance of the article as projected upon the screen will be readily detected, even in instances where the cracks are not visible to the naked eye.

With the above and other objects in view which will be apparent to those skilled in the art to which the present invention appertains, the present invention consists in certain features of construction and combinations of parts to be hereinafter described with reference to the accompanying drawings, and then claimed.

In the drawings which illustrate suitable embodiments of the invention:

Figure 1 is a side elevation of one form of the inspection apparatus;

Figure 2 is an enlarged vertical section of the conveying portion of the apparatus taken approximately upon the line 2—2 of Figure 1;

Figure 3 is a section taken approximately on the line 3—3 of Figure 2 more clearly showing the construction of the conveying apparatus;

Figure 4 is a side elevation of a modification of the apparatus shown in Figure 1, wherein provision is made for magnetizing and coating the articles to be inspected with finely divided particles of magnetic material;

Figure 5 is a section of one form of magnetizing device taken approximately on line 5—5 of Figure 4;

Figure 6 is a horizontal section taken approximately on line 6—6 of Figure 4 and looking downwardly upon the magnetized and coated articles being conveyed;

Figure 7 is a longitudinal section taken approximately upon the line 7—7 of Figure 6;

Figure 8 is a vertical transverse section taken approximately on line 8—8 of Figure 4; and Figure 9 is a transverse vertical section taken approximately upon line 9—9 of Figure 4.

Referring to the accompanying drawings in which like numerals refer to like parts throughout the several views and particularly to Figures 1 to 3 inclusive, the apparatus shown in these views embodies a main base 10 upon which the projection device 11 is supported and which carries a rotary conveying device 12 to which the articles to be inspected, here shown as ordnance projectiles 13, are fed by a suitable gravity conveyor 14 and from which the inspected articles are conveyed by upper and lower gravity conveyors 15 and 16, respectively. The lower conveyor 16 is provided for conveying the perfect articles from the apparatus and the conveyor 15 is provided for receiving the rejected articles.

The base 10 embodies vertically extending side walls 17 and an intermediate vertically extending supporting wall 18 spaced from the side walls 17, as shown in Figure 2.

The rotary conveyor 12 includes a rotatable shaft 19 journalled in suitable bearings 20 supported by the side walls 17 and intermediate wall 18, and a pair of spaced disc-like members 21 keyed to the shaft 19 for rotation therewith. The disc-like members 21 are provided with uniformly spaced notches or recesses 22 in the peripheries thereof which recesses are complemental to the opposite ends of the article to be inspected for supporting the articles. The disc-like members 21 are rotated by means of a Geneva gear drive mechanism comprising a Geneva gear 23 keyed to the shaft 19 intermediate the disc-like members 21, and a suitable member 24 keyed to a shaft 25 rotatably supported by the intermediate wall 18. The shaft 25 is provided with a drive gear 26 secured thereto which is driven by means of a worm pinion 27 secured to a shaft 28 rotatably supported by the intermediate wall 18 and driven by an electric motor 29. The member 24 carries a cam pin 30 which upon reaching a predetermined location during each revolution thereof enters one of the recesses 31 in the Geneva gear 23 so that the disc-like members 21 will be rotated, step-by-step, a distance corresponding to the spacing between the recesses 31. The spacing employed in the present invention is such as to move the article-supporting recesses 22 from the article-receiving position adjacent the discharge end of the feeding conveyor or chute 14 as shown in Figure 3 to the inspection position I shown in Figure 3. This inspection position is directly below the projection device 11 and within a vertical plane passing through the axis of the drive shaft 19.

In order to effect rotation of the article 13 when it reaches the inspection position I and prior to the succeeding partial rotation of the disc-like members 21 a pair of parallel rotatable shafts 35 are supported on the intermediate wall 18 and provided with narrow faced rollers 32 at their opposite ends. Each shaft 35 is driven by a pinion 33 from a common drive pinion 34, the gear 34 being driven from a bevel gear arrangement 36 which in turn is driven from a pinion 37 keyed to the Geneva gear shaft 25. The axes of the shaft 35 are arranged in a horizontal plane at such distance above the axis of the drive shaft 19 that when an article 13 is moved to the inspection station or position I, it is raised slightly from its seating engagement with the bottoms of the recesses 22 so that it can be easily rotated by means of the rollers 32 without frictional engagement with the bottoms of the supporting recesses 22. This raised position of the article 13 is clearly shown in Figures 2 and 3.

It is thus seen that when the article 13 is moved to its inspection position I and supported directly on the rollers 32 that due to the rotation of these rollers it is rotated. Since the projection device 11 projects an enlarged image upon the screen 38, shown in broken outline in Figure 1, it is obvious that the projected image will change according to the rotation of the object with the result that the inspector observing the screen 38 will be enabled to observe and detect any surface crack appearing in the peripheral surface of the particular article being inspected.

The article supporting recesses 22 in the disc-like members 21 are of such spacing that the article being rotated during the dwell in the rotation of the shaft 19 is rotated through one or more complete revolutions depending, of course, upon the speed at which the rollers 32 are driven.

Upon the next rotatable movement of the disc-like members 21, the article is carried from the rollers 32 counter-clockwise as viewed in Figure 3 to the feed end of the discharge conveyor 16 which is provided with an upwardly extending prong 16a arranged to deflect the article from the supporting recesses 22 onto the conveyor 16. The article is then free to roll by gravity along this conveyor to a suitable unloading position.

As shown in Figure 3 and in broken outline in Figure 1, a lever arrangement 39 is provided upon a pivot 40 and is normally held in the retracted position shown in Figure 1 by means of a tension spring 41. Associated with the arm 39 is an electro-magnet device 42. In the event that the inspector should detect a flaw in the article under immediate inspection he can by means of a switch or push button (not shown) close the circuit to the electro-magnet device 42 to energize the same whereby it will attract one leg of the lever 39 and pivot it against the resistance of the spring 41 to the position shown in Figure 3 adjacent the feed end of the discharge conveyor 15 with the result that the cam surface 15a on the other leg of the lever 39 will deflect the rejected article from its supporting recesses onto the conveyor 15.

The apparatus just described, while being simple in construction, affords a means for rapidly inspecting articles for surface flaws or cracks due to the fact that it is not necessary for the inspector to go through the motions of removing the articles to be inspected from a conveyor or bin, manually handling and rotating each individual article to inspect the surfaces thereof, and, after inspection, placing them back on a conveyor or in a bin. The articles are rapidly and successively fed to the predetermined inspection or projecting station where they are automatically rotated adjacent the projection device at any desired speed so that during such rotation an enlarged image of each axial increment of the peripheral surface of each article is progressively projected upon the screen. It will be readily apparent to those skilled in the art that if there is a surface crack or flaw in the article such defect or imperfection will appear in the projected image in the form of a break in the uniform continuity of the surface of the articles being inspected such as a distinct line or shadow.

In the modified construction shown in Figures 4 to 9, inclusive, provision is made for successively conveying the articles to be inspected to an inspection or projecting station and for rotating the same in association with a projecting device, as in the manner described in connection with the device of Figures 1, 2 and 3. In order to facilitate the inspection of the projected image, I have incorporated in the modified device an apparatus of such character that the articles can by magnetic attraction be coated with finely divided particles of magnetic material. In this connection, I have provided an elongated endless conveying mechanism in association with apparatus for magnetizing and de-magnetizing the articles before and after inspection of the same, respectively.

The conveying mechanism includes a pair of parallel spaced endless link members 50 entirely separate from each other but carried by spaced freely rotatable sprocket wheels 51 at one end and spaced driven sprocket wheels 52 at the opposite end. The sprocket wheels 51 are keyed to a shaft 53 which is journalled at its ends in spaced supports 54 and the sprocket wheels 52 are similarly keyed to a shaft 55 which is journalled in spaced supports 56.

Provision is made for rotating the shaft 55 to impart step-by-step movement to the conveyor in a clock-wise direction through the medium of a Geneva gear 57 secured to one sprocket wheel 52. The Geneva gear 57 is driven from a cam member 58a having a Geneva gear engaging cam 58b through suitable gearing 58 which in turn is driven by a suitable electric motor 59 or other suitable source of motive power. It is obvious that by this arrangement the endless link members 50 are simultaneously and intermittently driven at the same rate of speed.

The projectiles or other articles 62 to be inspected are supported on brackets 60 secured to each of the endless link members at regularly spaced intervals. These brackets are suitably recessed at 61 to engage and support the opposite ends of the article 62 through engagement with a narrow axial extent thereof, as shown in Figures 6 and 9, so that the articles are carried by the upper or feed side of the conveying mechanism in a clock-wise direction.

The conveyor extends between the side walls 63 of the base 64 which supports the projection device 65, as shown in Figure 4, and an upwardly extending member 66 is provided between the base side walls 63 in spaced relation with respect thereto to support a freely rotatable shaft 67. Idler sprockets 68 in engagement with the link members 50 are keyed to the shaft 67 to provide a firm support for the upper sides of the endless link members 50 directly below the projection device 65.

As in the construction first described the intermediate member 66 is provided with an upwardly extending extension 69 to support a pair of spaced parallel shafts 70, each of which is provided at its ends with narrow faced rollers 71. These shafts are provided with pinions 72 which are meshed with a common drive pinion 73 mounted on a shaft 74, the shaft 74 being rotatably carried by the extension 69. The shaft 74 is rotated through the medium of bevel gears 75 and a shaft 76 which in turn is driven through bevel gears 77 from the shaft 78 which carries the Geneva gear 58a and the drive gear 58. The rollers 71 are continuously rotated and are so elevated with respect to the axis of each article being moved to the inspection station I that as the article is moved over the same and brought into supporting relation between the rollers 71 the ends of the article are raised slightly from the bottom of the supporting recesses 71 in the supporting brackets 60 whereby to permit free rotation of the article. The spacing of the recesses in the Geneva gear 57 corresponds with the spacing of the bracket supports 60 and the Geneva gear mechanism is so timed that the movement of the conveyor link members 50 ceases immediately as each pair of supporting brackets 60 reach a position midway between the axes of the article rotating rollers 71 whereby each article upon reaching the inspection station I is freely rotated during the period at which the conveyor is at rest. The period during which the conveyor is at rest is of course sufficient to permit each article at the inspection station I to be rotated through one or more revolutions as desired. Any suitable means may be provided for automatically ejecting rejected articles from the conveyor or if desired they may be manually lifted from the conveyor, one of the articles, indicated at 62a in Figure 4, being shown removed from the supporting brackets 60.

The upper or feed side of the conveyor intermediate the sprockets 51 and 68 is arranged to travel through a downwardly offset path as shown in Figure 4. This is provided for by arranging spaced idler sprockets 79 adjacent the sprockets 51 to engage the underside of the link members 50 and by arranging spaced pairs of spaced sprockets 80 between the sprockets 68 and 79 with their axes disposed below the axes of the sprocket 79 to engage the upper side of the link members 50. It is thus seen in Figure 4 that the link members 50 during their clockwise travel between the sprockets 51 and 68 are caused to travel through a downwardly offset path.

During the travel of the articles 62 through this downwardly offset path they are caused to pass through a chamber 81 containing a mixture of finely divided particles of magnetic material, such as iron filings, and a liquid such as kerosene, which mixture is drawn from the bottom of the chamber 81 by means of a circulating pump 82 and sprayed through the member 83 into the top of the chamber 81 above the path of travel of the articles moving through the chamber. This circulation agitates the finely divided particles and keeps them in a state of suspension in the liquid.

Associated with the upper side of the conveying mechanism is an electro-magnetic device 84 having a coil 85 connected with any suitable source of direct current energy and a C-shaped pole piece 86 having the ends of the C thereof in axial alinement with the articles 62 carried by the conveying mechanism, as shown in Figures 4 and 5. Due to the energization of the coil 85, the articles 62 as they are moved between the ends of the pole piece 86 become magnetized so that as they continue in their travel through the chamber 81 they will attract and become coated with the finely divided particles of magnetic material which are in suspension in the liquid in the chamber 81.

The link members 50 and the supporting bracket 60 are of any suitable non-magnetic material so that they will not become magnetized during their travel adjacent the electro-magnetic device 84. The sprockets 80 likewise are of non-magnetic material so that they will not attract the iron filings or other magnetic material contained within the chamber 81. Similarly, the rollers 71 are of a suitable non-magnetic material.

The articles 62 being successively moved to the inspection or projecting station I are thus covered with a coating of iron filings or whatever magnetic material is employed which will adhere to the surfaces of the article as they are rotated and being inspected. During their travel from the inspection station I, the articles are caused to pass through a demagnetizing device 87 of a construction similar to that of a magnetizing device 84. The source of energy for the coil 88 of the device 87 is alternating electric current so that the magnetized articles 62 will be demagnetized by the demagnetizing field generated by the device 87. The articles leaving the demagnetizing device 87 are then conducted toward a suitable gravity discharge chute 89 having an extension 90 extending between the link members 50 in such manner that as the link members travel around the sprockets 52 the extension 90 tends to lift the inspected articles from these supporting brackets 60 so that they are directed onto the chute 89. Since the inspected articles have been demagnetized by the device 87 the iron filings or other magnetic material will drop from the same as they move along the chute 89. It is preferable that the chute 89 also be of non-magnetic material so that any magnetism remaining in the finely divided particles will not cause the same to adhere or build up on the chute 89.

If there are no surface cracks or flaws in the articles 62 the finely divided particles of magnetic material will in accordance with the well known laws of magnetism lie flat on the surfaces of the articles. However, if there is a surface crack or flaw in the article being inspected the lines of magnetic flux tend to travel through the metal of the article around such crack with the result that due to this change in flux path, the magnetized finely divided particles will tend to extend normal to the surface of the article at such crack. Since the projection device 65 projects the surface image of the article upon the screen 91, shown in broken outline in Figure 1, the enlarged image of the magnetized particles which extend normal to the surface of the article will indicate a break in the uniform continuity or change in pattern of the surface of the article which will be readily visible to the inspector.

The apparatus just described affords a closer inspection than may be possible with the apparatus of Figures 1, 2 and 3 and this is particularly true in the case of rough surfaced or rough machined articles. It may be said that the particular surface characteristics of the articles to be inspected somewhat determine which apparatus is most applicable. In the case of the latter apparatus, it will be readily appreciated that the change in pattern of the finely divided particles on the surface of the articles being inspected due to the change in the flux path to pass around surface cracks in the material of the articles, will be readily observed in the projected image, especially where such image is considerably magnetized. Moreover, the change in pattern will appear even where the surface cracks are not visible to the naked eye.

The two types of conveying means illustrated and described have been selected to show different types that may be employed, and it is to be understood that the present invention contemplates any conveying means and driving means therefor that may be applicable. Also, any suitable means for magnetizing and demagnetizing the articles under inspection may be utilized, it being understood that any means which will create magnetizing and demagnetizing fields through which the articles may pass will suffice.

It will readily appear to those skilled in the art and those familiar with quantity production that I have provided inspection apparatus of a new order which will materially decrease the man power necessary in the old methods of inspection and yet provides means for materially increasing the rate of inspection. Both these factors are highly important at times of war where man power may be at a premium and where not only speed but also economical, close and efficient inspection is required. This is particularly true of articles of munitions such as shells and projectiles to which the present invention is particularly applicable. Nevertheless, the invention is in no manner confined to such articles because it is applicable to many other types of articles, as is readily apparent.

Those skilled in the art will readily appreciate that various modifications and arrangements of the parts may be made without departing from the spirit of the invention, the scope of which is defined by the appended claims.

What is claimed is:

1. In an apparatus for inspecting articles for surface imperfections and having a reflecting projector provided with an inspection station from which the image of the surface of the article to be inspected is projected, conveying means having spaced supports thereon for a plurality of articles to be inspected, for bodily conveying the articles supported thereby in predetermined order to said inspection station, means effective upon each article reaching said station for rotating it whereby the image of the entire peripheral surface thereof may be projected by said projector, and a common means for driving said conveying means and rotating means.

2. In an apparatus for inspecting articles for surface imperfections and having a reflecting projector provided with an inspection station from which the image of the surface of the article to be inspected is projected, conveying means having spaced supports thereon for a plurality of articles to be inspected, for bodily conveying the articles supported thereby in predetermined order to said inspection station, means effective upon each article reaching said station for rotating it whereby the image of the entire peripheral surface thereof may be projected by said projector, and a common means for driving said conveying means and rotating means, said common driving means being effective to intermittently actuate said conveying means in a manner to provide a period of rest during rotation of each article at said inspection station.

3. In an apparatus for inspecting articles for surface imperfections and having a reflecting projector provided with an inspection station from which the image of the surface of the article to be inspected is projected, conveying means having spaced supports thereon for a plurality of articles to be inspected, for bodily conveying the articles supported thereby in predetermined order to said inspection station, means effective upon each article reaching said station for rotating it whereby the image of the entire peripheral surface thereof may be projected by said projector, and a common means for driving said conveying means and rotating means, said common driving means including Geneva gear mechanism for effecting step-by-step movement of said conveying means corresponding to the spacing of said supports.

4. In an apparatus for inspecting articles for surface imperfections and having a reflecting projector provided with an inspection station from which the image of the surface of the article to be inspected is projected, conveying means having spaced supports thereon for a plurality of articles to be inspected, means for actuating said conveying means to successively position the articles carried thereby one by one at said inspection station, and means for effecting rotation of said articles upon being positioned at said station, whereby the image of the peripheral surface thereof may be projected by said projector, said rotating means being located at said station to engage the articles carried by said supports and disengage the same from said supports to permit free rotation thereof.

5. In an apparatus for inspecting articles for surface imperfections and having a reflecting projector provided with an inspection station from which the image of the surface of the article to be inspected is projected, rotary conveying means having uniformly spaced supports thereon for supporting articles to be inspected, means for intermittently rotating said conveying means to move the articles supported thereby one by one to and beyond said inspection station, and means at said station in the path of the articles carried by said conveying means for disengaging each article as it reaches said station from said supports and rotating such article relative to said supports.

6. In an inspection apparatus having a reflecting projector for projecting surface images of magnetized articles to be inspected for surface imperfections, said projector having a projecting station, means containing finely divided particles of magnetic material, conveying means for conveying magnetized articles to be inspected one by one first through said particles whereby the articles due to their magnetism become coated with said particles and thence to said projecting station for projection of the images of the coated surfaces thereof, and means for actuating said conveying means.

7. In an inspection apparatus having a reflecting projector for projecting surface images of magnetized articles to be inspected for surface imperfections, said projector having a projecting station, means containing finely divided particles of magnetic material, conveying means for conveying magnetized articles to be inspected one by one first through said particles whereby the articles due to their magnetism become coated with said particles and thence to said projecting station for projection of the images of the coated surfaces thereof, means for actuating said conveying means, and means for rotating the coated articles upon reaching said projecting station whereby images of the entire peripheral surfaces thereof may be progressively projected.

8. In an inspection apparatus having a reflecting projector for projecting surface images of magnetized articles to be inspected for surface imperfections, said projector having a projecting station, a chamber for containing a liquid and finely divided particles of magnetic material suspended in the liquid, conveying means for conveying magnetized articles to be inspected one by one first through the liquid contained within said chamber whereby such articles due to their magnetism become coated with the suspended magnetic particles, and thence to said projecting station for projection of the images of the coated surfaces thereof, and means for actuating said conveying means.

9. In an inspection apparatus having a reflecting projector for projecting surface images of magnetized articles to be inspected for surface imperfections, said projector having a projecting station, a chamber for containing a liquid and finely divided particles of magnetic material suspended in the liquid, conveying means for conveying magnetized articles to be inspected one by one first through the liquid contained within said chamber whereby such articles due to their magnetism become coated with the suspended magnetic particles, and thence to said projecting station for projection of the images of the coated surfaces thereof, means for agitating the liquid in said chamber to maintain the magnetic particles in suspension, and means for actuating said conveying means.

10. In an inspection apparatus having a reflecting projector for projecting surface images of articles of magnetic material to be inspected for surface imperfections, said projector having a projecting station, means for generating a magnetic field, means containing finely divided particles of magnetic material between said generating means and projecting station, conveying means for conveying articles to be inspected one by one sequentially first through said magnetic field whereby the articles become magnetized thereby, thence through said particles whereby to become coated by reason of their magnetism with particles of the magnetic material and then to said projecting station for projection of the images of the coated surfaces thereof, and means for driving said conveying means.

11. In an inspection apparatus having a reflecting projector for projecting surface images of articles of magnetic material to be inspected for surface imperfections, said projector having a projecting station, means for generating a magnetic field, means containing finely divided particles of magnetic material between said generating means and projecting station, conveying means for conveying articles to be inspected one by one sequentially first through said magnetic field whereby the articles become magnetized thereby, thence through said particles whereby to become coated by reason of their magnetism with particles of the magnetic material and then to said projecting station for projection of the images of the coated surfaces thereof, and means for driving said conveying means, said apparatus including means adjacent said conveying means for demagnetizing the coated articles moved away from said projecting station by said conveying means.

12. In an inspection apparatus having a reflecting projector for projecting surface images of articles of magnetic material to be inspected for surface imperfections, said projector having a projecting station, means for generating a magnetic field, means containing finely divided particles of magnetic material between said generating means and projecting station, conveying means for conveying articles to be inspected one by one sequentially first through said magnetic field whereby the articles become magnetized thereby, thence through said particles whereby to become coated by reason of their magnetism with particles of the magnetic material and then to said projecting station for projection of the images of the coated surfaces thereof, said conveying means having uniformly spaced article supports, and means for intermittently advancing said conveying means a distance corresponding to the spacing of said supports whereby each article carried by said conveying means is maintained stationary for a predetermined period of time in said field and source and at said projecting station.

13. In an inspection apparatus having a reflecting projector for projecting surface images of articles of magnetic material to be inspected for surface imperfections, said projector having a projecting station, means for generating a magnetic field, means containing finely divided particles of magnetic material between said generating means and projecting station, conveying means for conveying articles to be inspected one by one sequentially first through said magnetic field whereby the articles become magnetized thereby, thence through said particles whereby to become coated by reason of their magnetism with particles of the magnetic material and then to said projecting station for projection of the images of the coated surfaces thereof, and means for driving said conveying means, said conveying means having uniformly spaced article supports of non-magnetizable material.

JOHN C. WHITESELL, JR.